(12) United States Patent
Mollenauer

(10) Patent No.: US 6,532,330 B1
(45) Date of Patent: Mar. 11, 2003

(54) DISPERSION MANAGED OPTICAL TRANSMISSION LINE AND METHOD FOR MAKING SAME

(75) Inventor: Linn Frederick Mollenauer, Colts Neck, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 152 days.

(21) Appl. No.: 09/596,454

(22) Filed: Jun. 19, 2000

Related U.S. Application Data

(60) Provisional application No. 60/163,543, filed on Nov. 4, 1999.

(51) Int. Cl.$^7$ ................................................. G02B 6/02
(52) U.S. Cl. ........................................ 385/123; 359/161
(58) Field of Search ............................ 385/123, 24, 28, 385/27; 359/161, 115, 173, 179, 124

(56) References Cited

U.S. PATENT DOCUMENTS 5,559,920 A * 9/1996 Chraplyvy et al. ......... 359/115
6,317,238 B1 * 11/2001 Bergano et al. ............. 359/161

(List continued on next page.)

OTHER PUBLICATIONS

Gruner–Nielsen et al, "Design and manufacture of dispersion compensating fiber for simultaneous compensation of dispersion and dispersion slope", Feb. 1999, Optical Fiber Communication Conference, 1999, pp. 232–234, vol. 2.*

(List continued on next page.)

*Primary Examiner*—Ellen E. Kim

(57) ABSTRACT

Techniques are described for constructing an optical fiber transmission line having a desired length and path-average dispersion, while also having a desired total $\frac{\partial D}{\partial \lambda}$.

In one approach, a first fiber is selected with a first dispersion and $$\frac{\partial D}{\partial \lambda},$$

and a second fiber is selected with a second dispersion and $$\frac{\partial D}{\partial \lambda}$$

having a sign opposite to that of the dispersion and $$\frac{\partial D}{\partial \lambda}$$

of the first fiber. A third fiber is then selected having a third dispersion and $$\frac{\partial D}{\partial \lambda}$$

such that when a combined transmission line having a desired total length and path-average dispersion is assembled from the first, second, and third fibers, the total $$\frac{\partial D}{\partial \lambda}$$

of the transmission line may be adjusted by adjusting the respective lengths of the first, second, and third fibers, while maintaining the desired total length and path-average dispersion $\bar{D}$ of the transmission line. The dispersion maps of the first, second, and third fibers are used to calculate the respective lengths of the three fibers needed to assemble a transmission line having the desired total length, path-average dispersion $\bar{D}$, and $$\frac{\partial D}{\partial \lambda}.$$

25 Claims, 12 Drawing Sheets

U.S. PATENT DOCUMENTS 6,317,539 B1 * 11/2001 Loh et al. .................... 359/127
6,366,728 B1 * 4/2002 Way et al. ................... 359/161

OTHER PUBLICATIONS

Gnauck et al, "Dispersion and dispersion–slope compensation of NZDSF over the entire C band using higher–order mode fiber", Nov. 2000, Electronics Letters, ages 1946–1947, vol. 36.*

Igarashi et al, "Ultrashort Light Pulse CDMA with simultaneous Fiber dispersion and dispersion slope compensation", 2001, Communication, computers and signal Processing, pp. 382–385, vol. 2.*

* cited by examiner

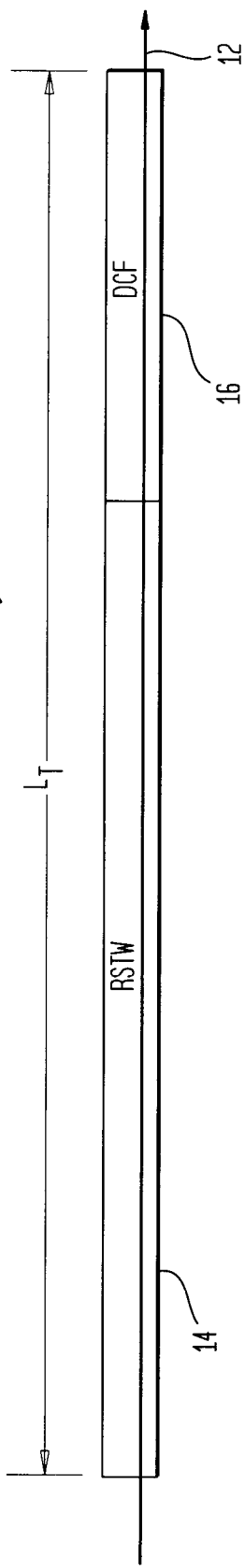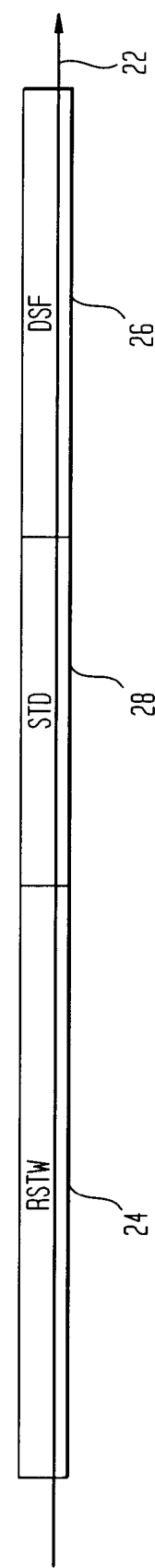

DISPERSION MANAGED OPTICAL TRANSMISSION LINE AND METHOD FOR MAKING SAME

The present application claims the benefit of U.S. Provisional Patent Application Ser. No. 60/163,543, filed on Nov. 4, 1999, which is hereby incorporated by reference in its entirety.

BACKGROUND OF THE INVENTION

1. Field of the Invention

The present invention relates generally to optical transmission lines, and more particularly to advantageous aspects of a dispersion-managed optical transmission line and methods for making the dispersion-managed optical transmission line.

2. Description of the Prior Art

In the area of terrestrial networks, there is increasing interest in all optical transmission over distances many times greater than the traditional 400–500 km spacing between centers of electronic regeneration and signal switching. This interest is driven, in part, by the economics of dense wavelength division multiplexing (WDM), which allows multiple signals of varying wavelength to be carried by a single optical line.

As all-optical transmission lengths increase, it is increasingly important to manage the dispersion of optical signals along the line. There is a considerable demand for providing a length of fiber optic cable having a specified amount of path-average dispersion $\overline{D}$. The path-average dispersion $\overline{D}$ for a given span of optical fiber of length L may be expressed mathematically as follows:

$$\overline{D} = \frac{1}{L}\int_0^L D(x)dx$$

where the lead end of the optical fiber is mapped to the origin, and where $D(x)$ is the dispersion parameter D at each point x along the span of optical fiber away from the lead end.

It is useful to express $\overline{D}$ in the above manner because although a particular reel of optical fiber may be known to have a certain dispersion, it does not necessarily follow that a section of optical fiber cut from that reel will have the same dispersion. The reason that this is so is illustrated in FIG. 1, which shows a graph 1 of the function $D(x)$ for a length of positive-dispersion optical fiber. The graph in FIG. 1 was generated using a dispersion optical time-domain reflectometer (OTDR). As shown in FIG. 1, the value for the dispersion parameter D varies significantly and irregularly along the length of the fiber. The dispersion function is irregular because of inhomogeneities in optical fiber introduced by the manufacturing process. Thus, depending upon where the fiber is cut, $\overline{D}$ for the cut section of fiber may be higher or lower than the overall $\overline{D}$ for the entire reel of fiber.

In order to calculate the value of $\overline{D}$ for a given span of fiber, the function $D(x)$ is integrated to determine the area underneath $D(x)$ between the endpoints of the span. As expressed in equation (1), above, that area is then divided by the length of the fiber span to determine the average value for D along the length of the span. FIG. 2 shows a graph 2 of the integral $\int D(x)\,dx$ of the dispersion function $D(x)$ shown in FIG. 1.

For applications involving the transmission of non-return-to-zero (NRZ) data, the desired overall value for $\overline{D}$ for the transmission line is zero. For soliton data transmission, the desired $\overline{D}$ is in the range of approximately 0.05 to 0.5 picoseconds per nanometer per kilometer (ps/nm-km). One way of achieving the desired $\overline{D}$ is to couple a length of optical fiber having a positive dispersion characteristic with a length of optical fiber that has been doped to have a negative dispersion characteristic. The desired path-average dispersion $\overline{D}$ of the transmission line is obtained by adjusting the relative lengths of the positive-dispersion and negative-dispersion fibers. However, because of the above-described irregularities in the dispersion characteristics of optical fiber, the process of piecing together spans of positive-dispersion and negative dispersion fiber to achieve a precise desired overall path-average dispersion $\overline{D}$ has proven to be challenging.

The original process used to construct a transmission line from positive-dispersion and negative-dispersion fibers to achieve a desired path-average dispersion $\overline{D}$ was based upon trial and error. Because of the inhomogeneities in the fiber, this was a frustrating and time-consuming process, and wasted significant amounts of expensive optical fiber. These and other issues in the art are addressed by U.S. Pat. No. 6,011,615, entitled "Fiber Optic Cable Having a Specified Path Average Dispersion," assigned to the assignee of the present application, which is hereby incorporated by reference in its entirety. This patent describes a technique for precisely determining the respective lengths of the two fibers based upon a graphical analysis of the fibers' dispersion maps.

However, a further issue has arisen in the construction of an ultra-long transmission line for use in dense WDM. Dense WDM employs a relatively wide range of wavelengths, i.e., 1530–1565 mm and well beyond. In order to be suitable for dense WDM, the path-average dispersion $\overline{D}$ for a given length of transmission line must be substantially uniform for the full range of signal wavelengths used. In other words, the slope $$\frac{\partial D}{\partial \lambda}$$

of the dispersion of the transmission line relative to signal wavelength must be zero.

Thus, in a two-fiber WDM transmission line, the compensating, negative-dispersion fiber must not only compensate for the signal dispersion introduced by the positive-dispersion fiber to achieve the desired path-average dispersion $\overline{D}$, but must also compensate for the slope $$\frac{\partial D}{\partial \lambda}$$

of the positive-dispersion fiber, such that the slope $$\frac{\partial D}{\partial \lambda}$$

of the two combined fibers is zero. However, depending upon the requirements of the transmission line, it may be necessary or desirable to use a positive-dispersion fiber in conjunction with a negative-dispersion fiber that does not precisely compensate for both dispersion and $$\frac{\partial D}{\partial \lambda}$$

at the same time. Further, even where the negative-dispersion fiber used in the transmission line compensates for both dispersion and $$\frac{\partial D}{\partial \lambda},$$

the average $$\frac{\partial D}{\partial \lambda}$$

may nonetheless require adjustment.

There is thus a need for a technique for adjusting the average $$\frac{\partial D}{\partial \lambda}$$

of a given length of transmission line, while maintaining a desired overall path-average dispersion $\overline{D}$. Further, such a technique must take into account the above-discussed inhomogeneities in the optical fibers making up the transmission line.

SUMMARY OF THE INVENTION

The above-described issues and others are addressed by the present invention, one aspect of which provides a method for constructing an optical fiber transmission line having a desired length and path-average dispersion $\overline{D}$, while also having a desired total $$\frac{\partial D}{\partial \lambda}.$$

The method comprises selecting first and second fibers having dispersions of opposite sign. A third fiber is then selected, having dispersion and $$\frac{\partial D}{\partial \lambda}$$

characteristics such that when a transmission line having a desired total length and path-average dispersion $\overline{D}$ is assembled from the first, second, and third fibers, the total $$\frac{\partial D}{\partial \lambda}$$

of the transmission line may be adjusted by adjusting the respective lengths of the first, second, and third fibers, while maintaining the desired total length and path-average dispersion $\overline{D}$ of the transmission line. According to a further aspect of the invention, the respective lengths of the first, second, and third fibers are calculated using the respective dispersion maps of the three fibers.

Additional features and advantages of the present invention will become apparent by reference to the following detailed description and accompanying drawings.

BRIEF DESCRIPTION OF THE DRAWINGS

FIG. 3 shows a diagram of an optical transmission line, comprising a length of Lucent Reduced-Slope True-Wave Fiber (RSTW) and a length of dispersion compensating fiber (DCF).

FIG. 4 shows a diagram of the transmission line shown in FIG. 3 that has been modified in accordance with a first embodiment of the present invention by adding a length of standard (STD) fiber.

of RSTW fiber, integrated with respect to fiber length.

Figure 10:
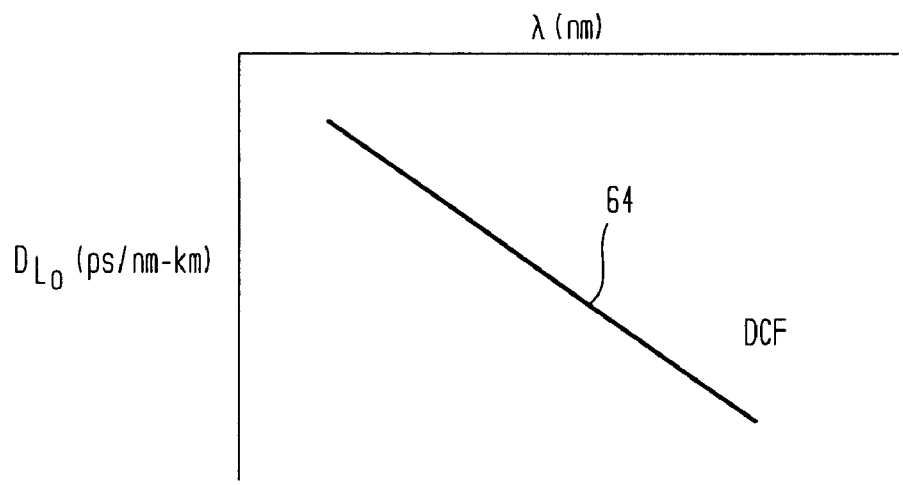

FIG. 10 shows a linearized map of dispersion as a function of wavelength for a given length of DCF fiber.

Figure 11:
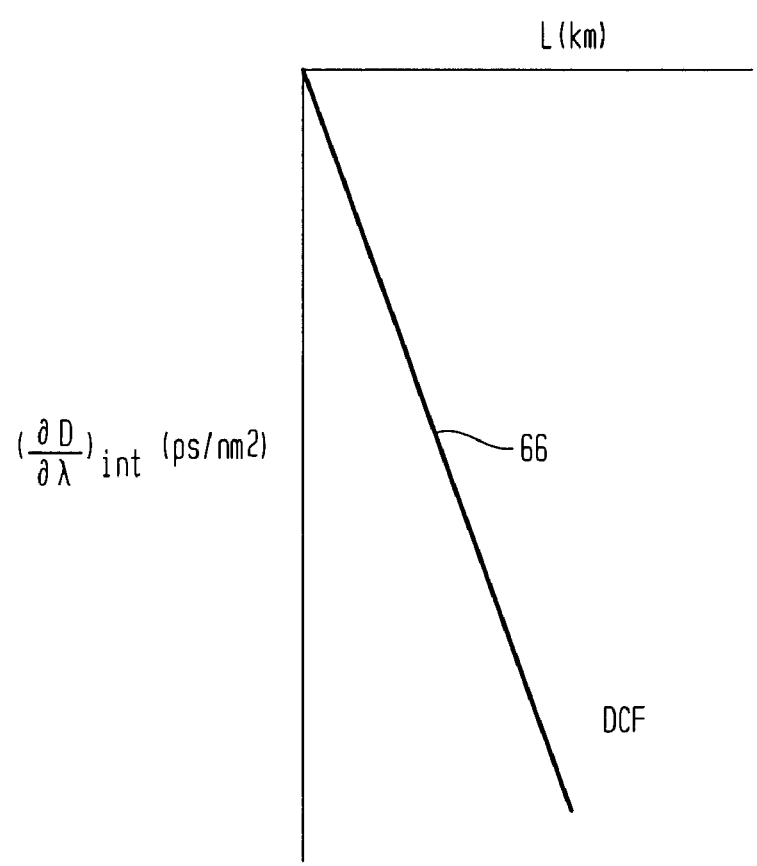

FIG. 11 shows a linearized map of $$\frac{\partial D}{\partial \lambda}$$

of DCF fiber, integrated with respect to fiber length.

Figure 7:
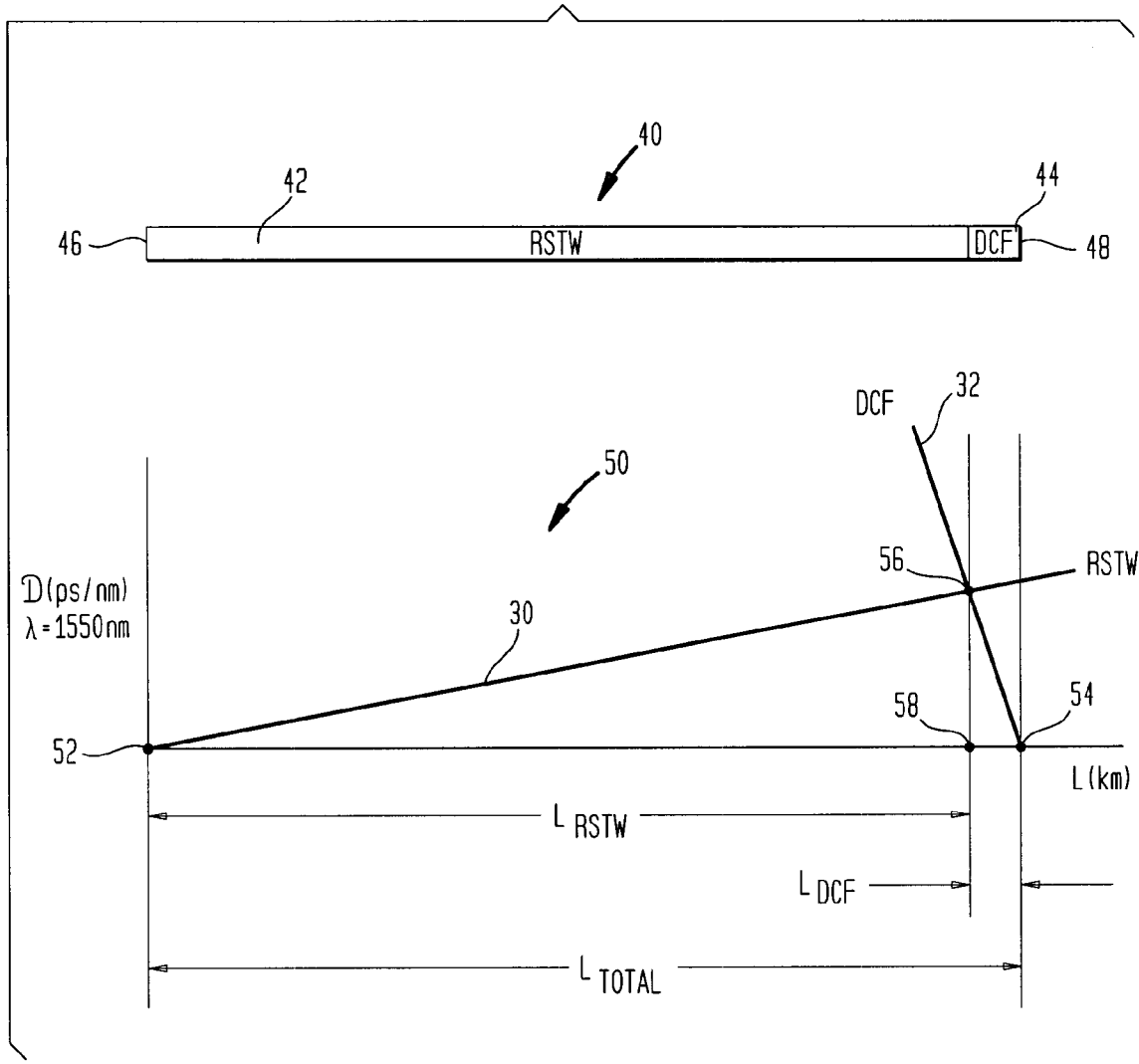
FIG. 7 shows a diagram of a transmission line assembled from lengths of RSTW and DCF fiber, and a graph illustrating a technique for calculating the respective lengths of RSTW and DCF fiber required to construct a transmission line having a desired total length and path-average dispersion, based upon a graphical analysis of the maps of their respective integrated dispersion functions.
Figure 12:
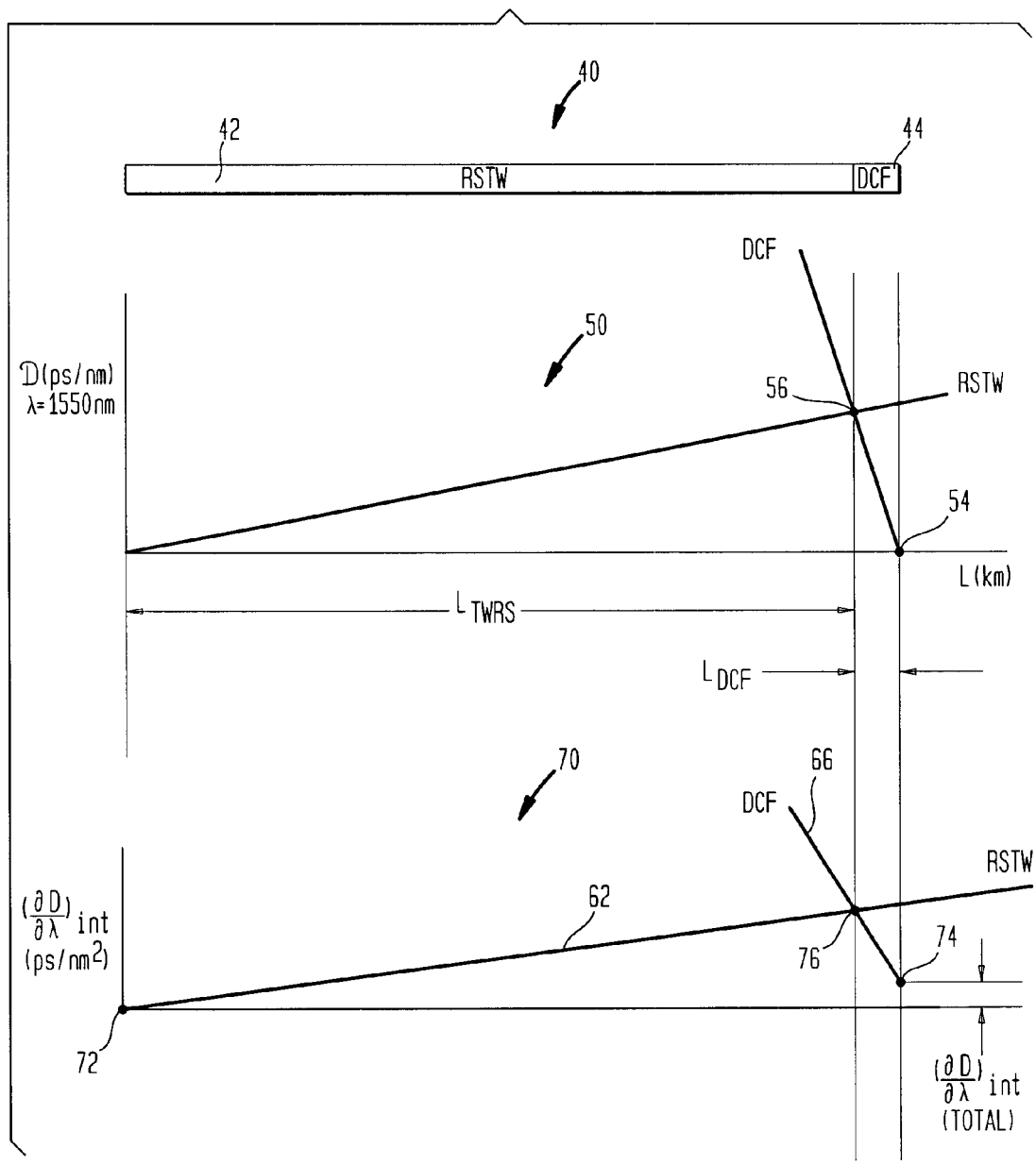

FIG. 12 shows the diagram and graph of FIG. 7 with an additional graph illustrating the total $$\left(\frac{\partial D}{\partial \lambda}\right) int$$

for the combined transmission line.

Figure 5:
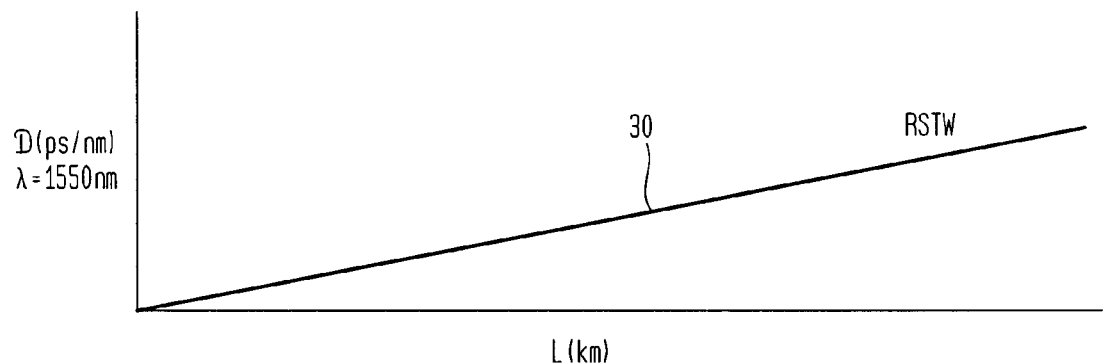
FIG. 5 shows a linearized map of the integrated dispersion function for RSTW fiber.
Figure 13:
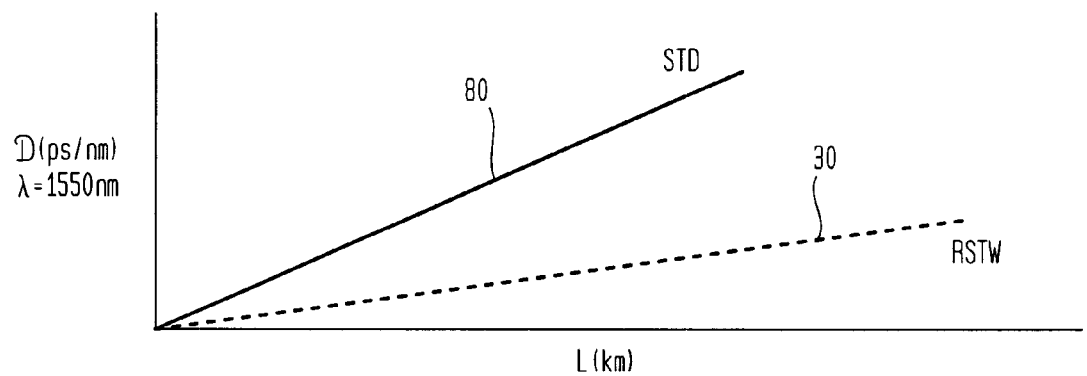

FIG. 13 shows a linearized map of the integrated dispersion function for standard fiber compared with the corresponding map for RSTW fiber shown in FIG. 5.

Figure 9:
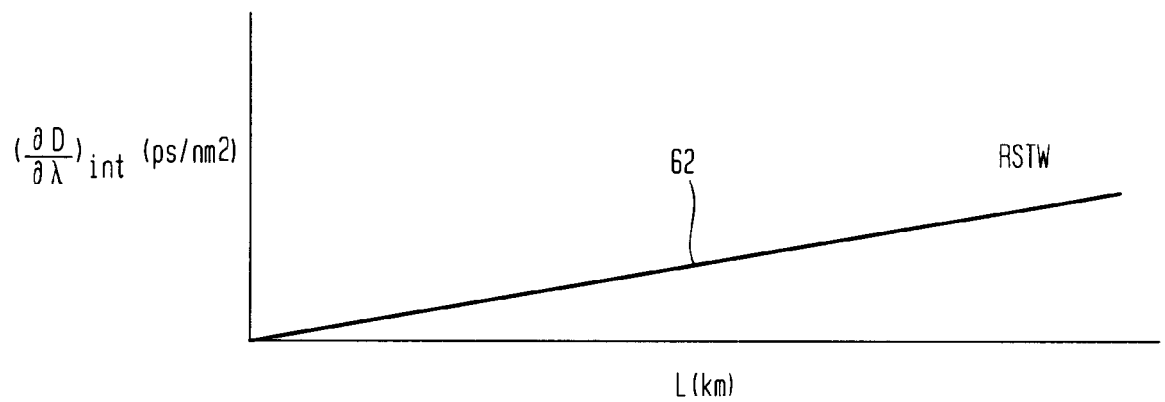
FIG. 9 shows a linearized map of $$\frac{\partial D}{\partial \lambda}$$
Figure 14:
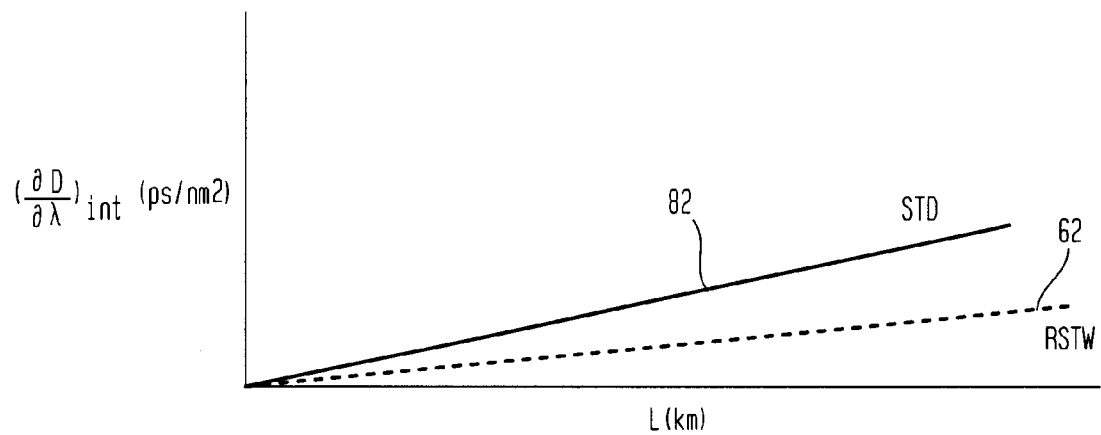

FIG. 14 shows a linearized map of $$\frac{\partial D}{\partial \lambda}$$

for standard fiber, integrated with respect to fiber length, compared with the corresponding map for RSTW fiber, shown in FIG. 9.

Figure 15:
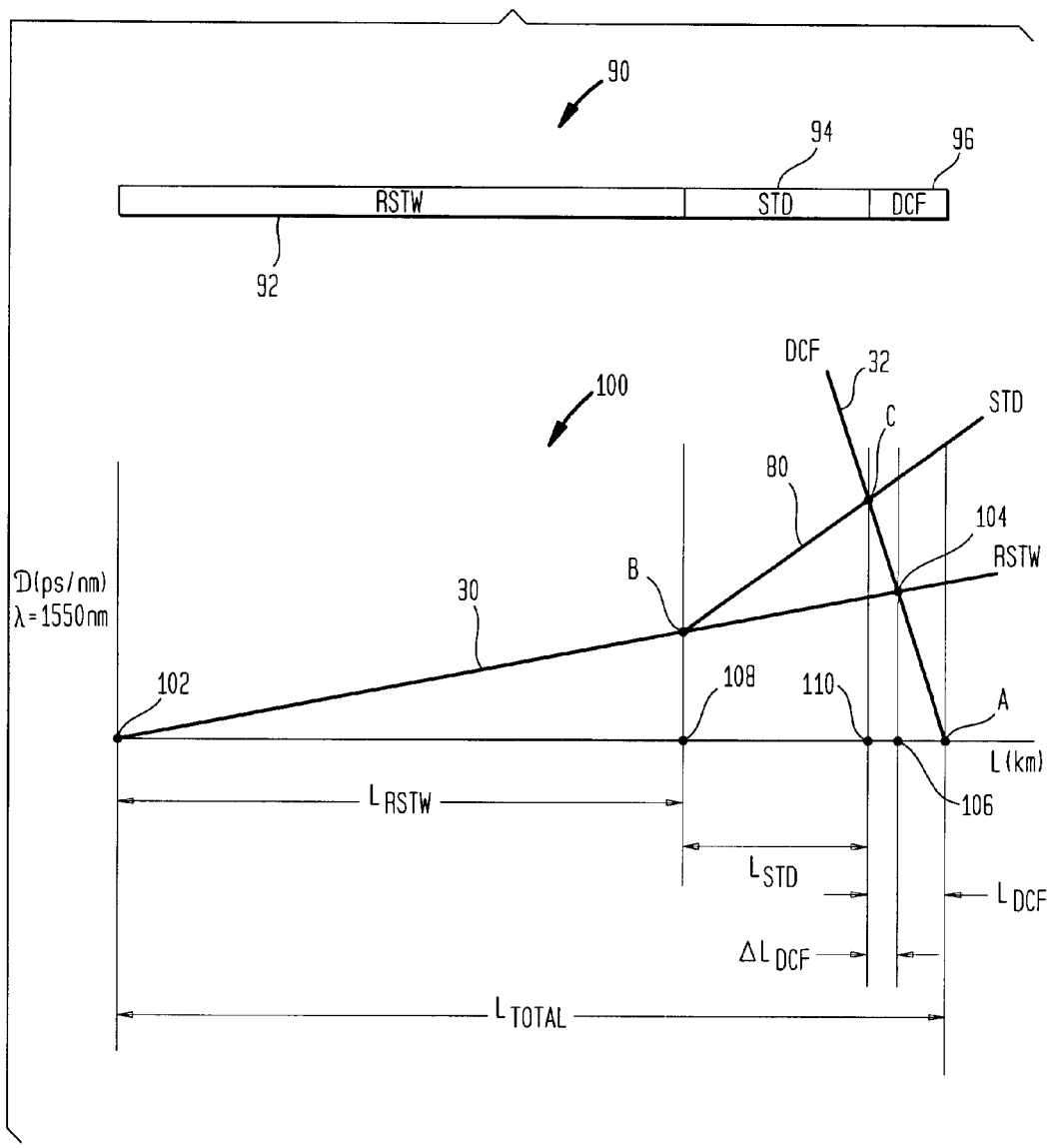

FIG. 15 shows a diagram of a transmission line assembled from lengths of RSTW, standard, and DCF fibers, and a graph illustrating the relationship between the lengths of the three fibers required to maintain a desired path-average dispersion $\overline{D}$ for the combined transmission line.

Figure 16:
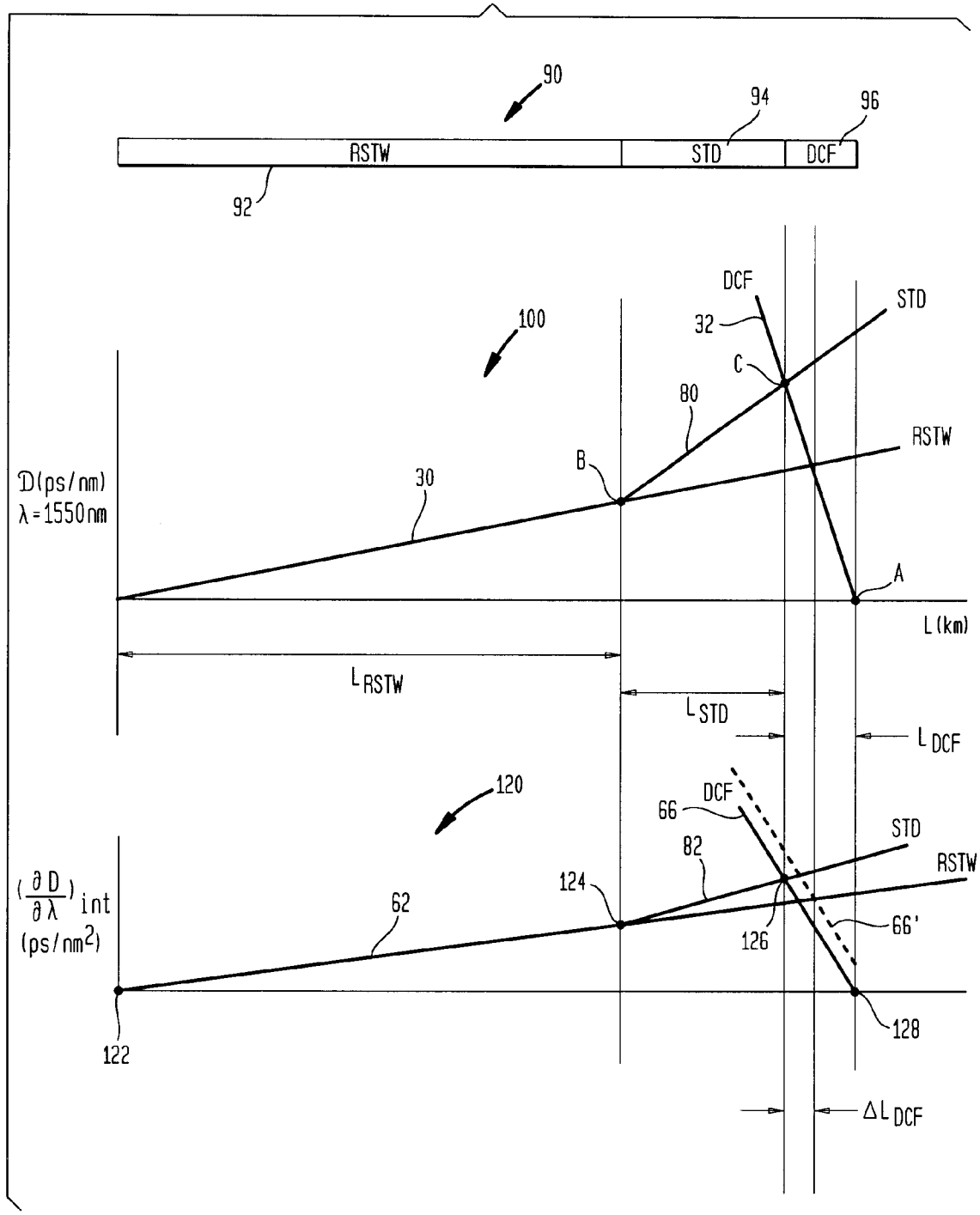

FIG. 16 shows the diagram and graph of FIG. 15 with an additional graph illustrating a technique for calculating the relative lengths of RSTW, standard, and DCF fibers required to construct a transmission line having a desired total length and path-averages dispersion $\overline{D}$, with a zero combined $$\frac{\partial D}{\partial \lambda}.$$

Figure 17:
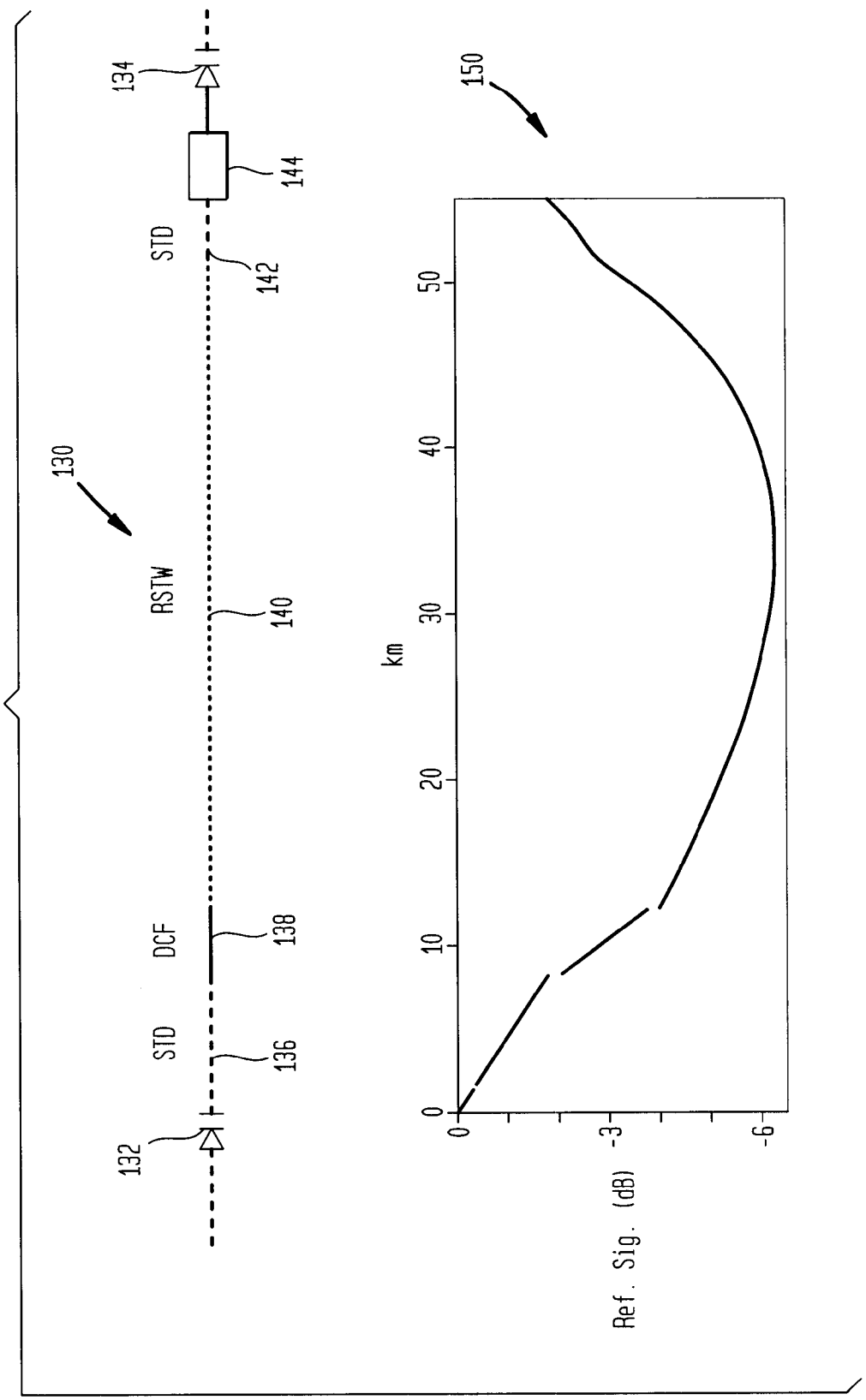

FIG. 17 shows a diagram of an optical transmission line embodying the present invention and a graph showing relative signal power versus distance.

Figure 18:
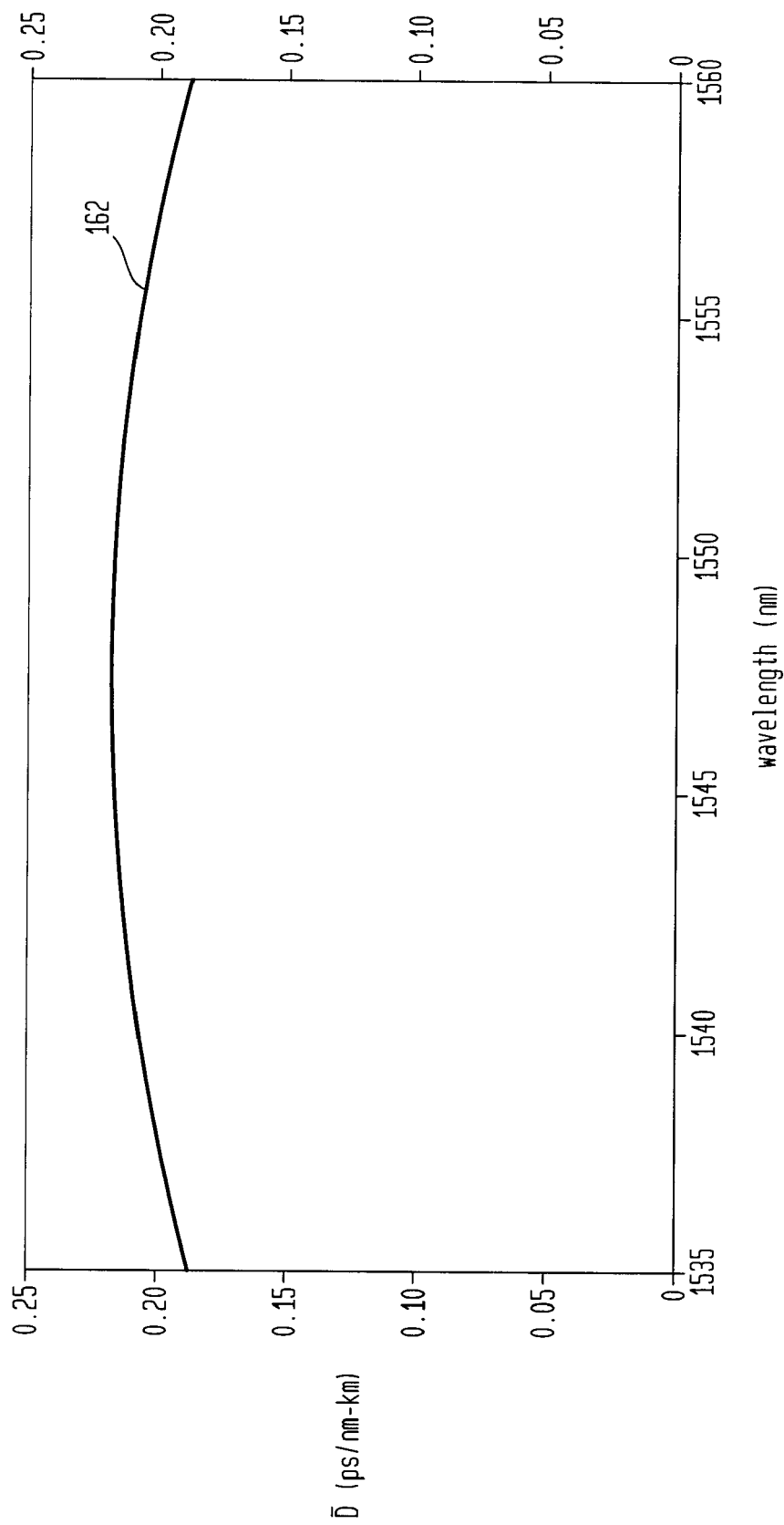

FIG. 18 shows a graph of the mean behavior of the path-average dispersion $\overline{D}$ as a function of wavelength for the transmission line shown in FIG. 17.

DETAILED DESCRIPTION

New fibers have been developed that are proving to be suitable for all-optical transmission over ultra-long distances, on the order of thousands of kilometers. One such fiber is Lucent Reduced Slope True Wave (RSTW) fiber, which is a low-slope, non-zero dispersion shifted fiber. In order to obtain a desired path-average dispersion $\overline{D}$, a length of RSTW may be coupled with a second length of optical fiber that has been doped to have a negative dispersion characteristic. One such fiber that is currently being investigated is an ultra-high-slope dispersion compensating fiber (DCF) developed by Lucent Denmark. Because of the magnitude of its negative dispersion parameter, a significantly shorter length of DCF fiber is needed in conjunction with a length of RSTW to obtain the desired $\overline{D}$.

FIG. 3 shows a diagram, not drawn to scale, of an optical transmission line 10 for carrying an optical signal 12. The transmission line 10 comprises a length of RSTW fiber 14 and a length of DCF fiber 16. The combined fibers 14 and 16 have a desired total length $L_T$. The dispersion characteristics of the two fibers are complementary, such that a desired path-average dispersion $\overline{D}$ for the transmission line 10, at a mean wavelength, may be obtained by adjusting the respective lengths of the two fibers. Because the DCF fiber 16 has a relatively high negative dispersion parameter and the RSTW has a relatively low positive dispersion parameter, a relatively short length of DCF fiber 16 is required to compensate for a greater length of RSTW fiber 14. As discussed above, the determination of the precise lengths of RSTW and DCF fiber required to obtain a desired path-average dispersion $\overline{D}$ has proven to be a challenging problem because of inhomogeneities in the fibers introduced by the manufacturing process. As described in detail below, techniques have been developed for calculating the lengths of the two fibers based upon the fibers' dispersion maps.

As addressed briefly above, the dispersion characteristics of each fiber are wavelength-dependent. In other words, the dispersion D of each of the two lengths of fiber 14 and 16 is sloped, relative to the signal wavelength $\lambda$. In order for the transmission line to be suitable for dense WDM and other applications having wide bandwidth requirements, the total slope $$\frac{\partial D}{\partial \lambda}$$

for the transmission line 10 must be zero around the mean signal wavelength. However, the negative $$\frac{\partial D}{\partial \lambda}$$

of the DCF fiber 16 is insufficiently large to fully compensate for the positive $$\frac{\partial D}{\partial \lambda}$$

of the RSTW fiber 14.

FIG. 4 shows a diagram, not drawn to scale, of a transmission line 20, constructed according to the present invention, for carrying a dense WDM signal 22. As shown in FIG. 4, the transmission line 20 includes a length of RSTW fiber 24 and a compensating length of DCF fiber 26. However, in accordance with the present invention, a length of standard optical fiber (STD) 28 has been assembled into the transmission line 20.

As described in detail below, the dispersion and $$\frac{\partial D}{\partial \lambda}$$

properties of the standard fiber are such that, by preserving a calculated relationship among the respective lengths of the RSTW, DCF, and standard fibers, the total $$\frac{\partial D}{\partial \lambda}$$

of the transmission line may be adjusted to zero, while maintaining the desired total length and path-average dispersion $\overline{D}$ for the transmission line 20. It will be appreciated that the addition of a third fiber adds another layer of complexity to the problem of inhomogeneities in the fibers. Because of this added layer of complexity, it would be extremely difficult, if not impossible, to arrive at correct lengths for the three fibers through trial and error.

It should be noted that although in the following discussion the present invention is illustrated using RSTW, DCF, and standard fibers, the invention may be used to assemble transmission lines from any of a number of different fiber types having suitable dispersion and $$\frac{\partial D}{\partial \lambda}$$

characteristics. For example, new dispersion compensating fibers are being developed that have a wide range of dispersion parameters and slopes. Thus, it would be possible to practice the present invention using a transmission line that includes a positive-dispersion fiber combined with two different negative-dispersion DCF fibers that have been selected to have suitable dispersion parameters and slopes.

As mentioned above, the path-average dispersion $\overline{D}$ for a given length L of optical fiber may be expressed as follows:

$$\overline{D} = \frac{1}{L}\int_0^L D(x)\,dx$$

For the purposes of the following discussion, it is useful to define the integrated dispersion value D for the length of fiber as follows:

$$\mathcal{D} = \overline{D}L = \int_0^L D(x)\,dx$$

Figure 6:
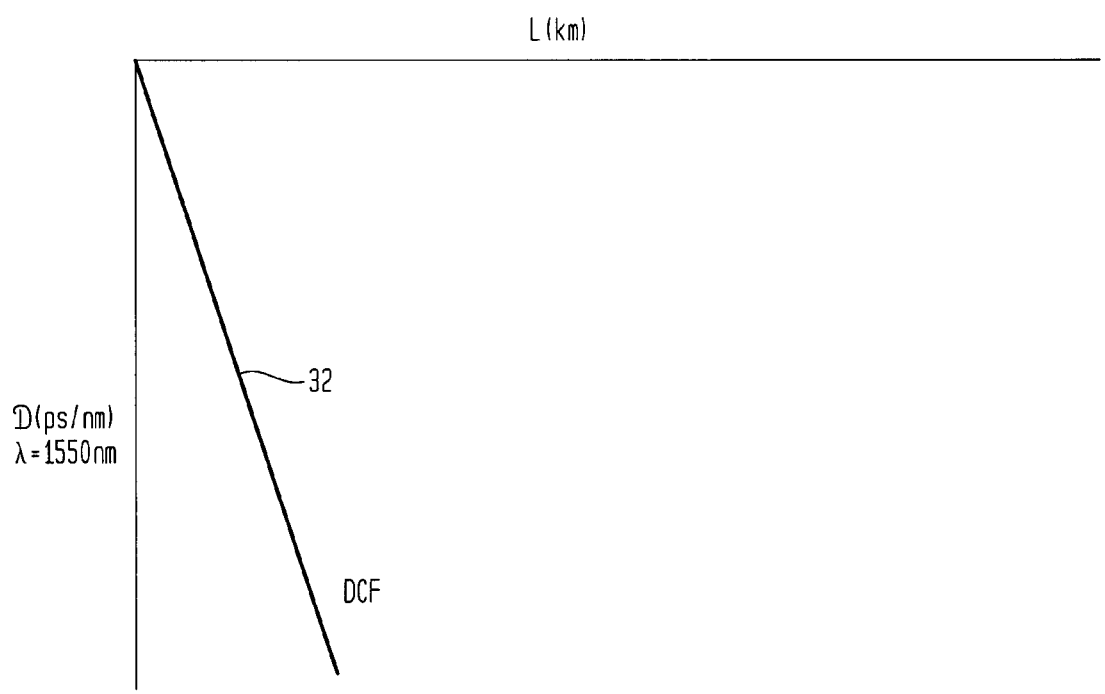
FIG. 6 shows a linearized map of the integrated dispersion function for DCF fiber.

FIG. 5 shows an illustrative map 30, not drawn to scale, of the integrated dispersion function for a length of RSTW fiber at a signal wavelength of 1550 nm. In map 30, the point corresponding to the lead end of the fiber is located at the origin. Thus, if a span is cut from the length of RSTW fiber mapped in FIG. 5, and the span includes the lead end of the fiber, the path-average dispersion $\overline{D}$ for the span of fiber may be determined by dividing the integrated dispersion value D for the endpoint of the span by the length of the span. FIG. 6 shows a similar illustrative map 32, again not drawn to scale, of the integrated dispersion function for a length of DCF fiber at a signal wavelength of 1550 nm.

Figure 1:
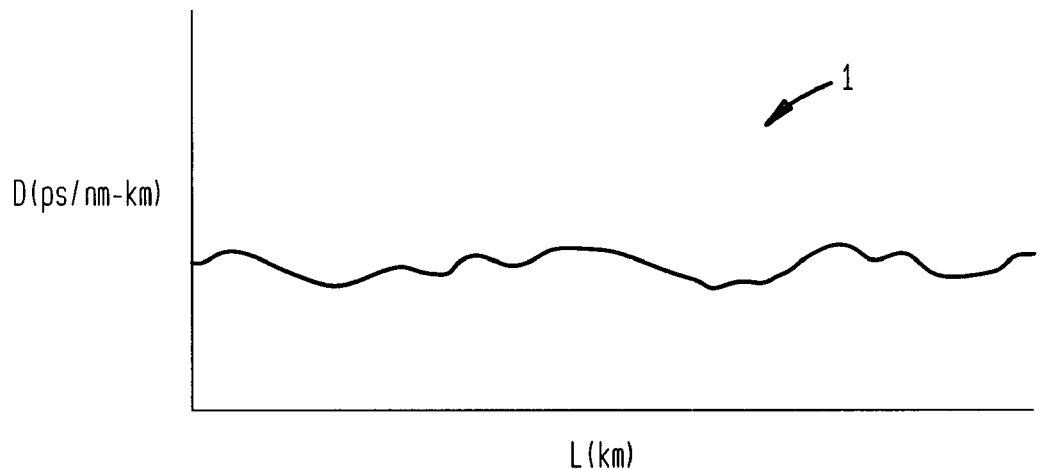
FIG. 1 shows a graph, according to the prior art, of the dispersion fuinction D(x) for a length of positive-dispersion fiber.
Figure 2:
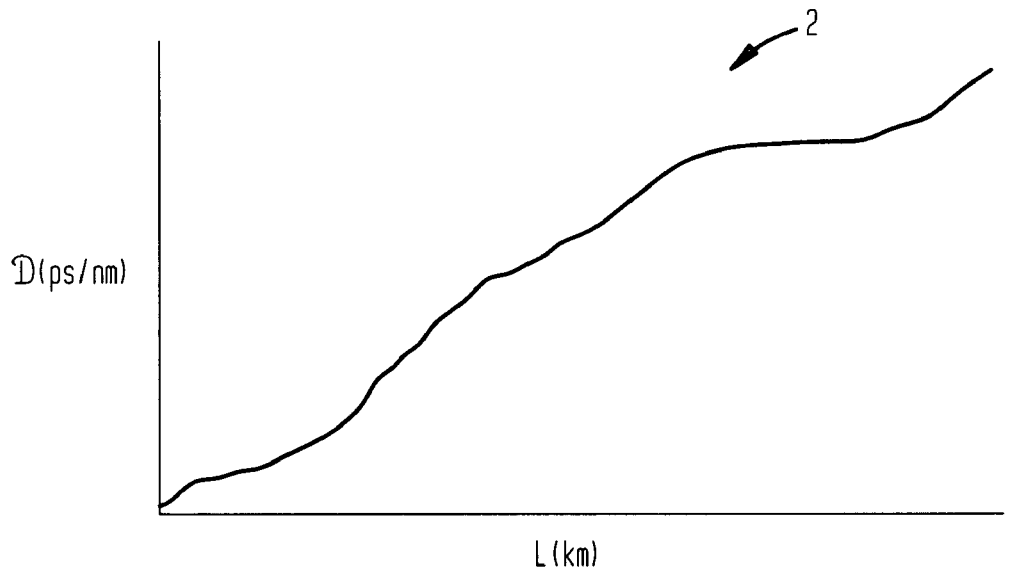
FIG. 2 shows a graph, according to the prior art, of the integral ∫D(x) dx of the dispersion function D(x) shown in FIG. 1.

For the purposes of discussion and illustration, the maps 30 and 32 have been linearized, based upon an average value for the dispersion $\overline{D}$ of the two fibers. At a signal wavelength of 1550 nm, the average dispersion of RSTW fiber is +4 ps/nm per kilometer, and the average negative dispersion of DCF fiber is −115 ps/nm per kilometer. However, as discussed above in connection with FIGS. 1 and 2, because of naturally-occuring inhomogeneities in optical fiber, each point in the RSTW dispersion maps 30 may actually vary by as much as ±0.5 ps/nm-km or more away from the expected average value, and each point in the DCF dispersion map 32 may vary by as much as ±10 ps/nm-km or more away from the expected average value. These variations are unpredictable, and must therefore be determined empirically. Thus, the calculation of the respective lengths of the two fibers is based upon an analysis of dispersion maps that have been generated for each individual reel of optical fiber. As briefly mentioned above, accurate maps of the dispersion functions for the RSTW and DCF fibers may be obtained through the use of a dispersion optical time-domain reflectometer (OTDR).

From the RSTW and DCF integrated dispersion maps 30 and 32 shown in FIGS. 5 and 6, it would be expected that in order to achieve a zero path-average dispersion $\overline{D}$ for a given length of transmission line, the required ratio between the respective lengths of DCF fiber to RSTW fiber in the transmission line would be the ratio of their respective dispersion parameters, or 28.75 to 1. However, because the actual dispersion parameters of RSTW and DCF vary unpredictably away from their average values, this ratio is only an approximation.

FIG. 7 shows a diagram of a transmission line 40 comprising lengths of RSTW fiber 42 and DCF fiber 44, and a graph 50 illustrating a technique for precisely determining the respective lengths of RSTW and DCF fiber required to obtain a desired path-average dispersion $\overline{D}$. The illustrated technique is taken from the previously mentioned U.S. Pat. No. 6,011,615, which is incorporated herein by reference. It should be noted that because the dispersion maps for the RSTW and DCF fibers are assumed to be linear for the purposes of the present discussion, the illustrated technique yields the expected ratio between the two fibers of 28.75 to 1. However, it will be appreciated from the following discussion that actual, irregular dispersion maps may be readily substituted for the linear dispersion maps to calculate the actual required ratio, which is likely to differ somewhat from the expected ratio, depending upon the particular irregularities in the dispersion maps.

The graph 50 at the lower portion of FIG. 7 is obtained by graphing the RSTW integrated dispersion map 30 shown in FIG. 3 onto a set of axes, with the x-coordinate corresponding to the fiber length, and the y-coordinate corresponding to the integrated dispersion D. The lead end 46 of the RSTW fiber 42 is located at the origin 52 of the graph 50, such that each point on the RSTW dispersion map 30 corresponds to the integrated dispersion D at a particular distance along the RSTW fiber away from the lead end 46.

The DCF integrated dispersion map 32 shown in FIG. 6 is then rotated by 180° and translated onto the FIG. 5 graph 50, such that the lead end 48 of the DCF fiber 44 is located at a point 54 on the graph 50 corresponding to the desired length of the combined transmission line 40 and the desired total value for the integrated dispersion D, which is calculated by multiplying the desired path-average dispersion $\overline{D}$ by the total length of the combined transmission line 40. In the present example, the total integrated dispersion D and the path-average dispersion $\overline{D}$ are both equal to zero. However, as mentioned above, a soliton transmission line requires a positive value for the path-average dispersion $\overline{D}$. Thus, in designing a soliton transmission line, the x-coordinate for point 54 would remain the same, but the y-coordinate would be a positive value, corresponding to the desired total path-average dispersion $\overline{D}$ multiplied by the length of the transmission line.

As shown in FIG. 7, the RSTW and DCF maps 30 and 32 intersect at a point 56. The x-coordinate 58 of this point 56 is then used to determine the precise lengths of the two fibers 16 and 18. The length of the RSTW fiber 42 is the distance between the origin 52 and point 58. The length of the DCF fiber 44 is the distance between point 58 and point 54. Of course, if desired, the length of either the RSTW or DCF fiber 44 could also be obtained by subtracting the length of the other fiber from the total length of the transmission line. Once the lengths have been calculated, each length is measured from the respective lead ends of the two fibers. The fibers are cut at the measured lengths, and then spliced together to form the transmission line.

It will be appreciated that the technique illustrated in FIG. 7 is equally applicable where the dispersion maps 30 and 32 are irregularly shaped, such as the maps obtained using a dispersion OTDR. As long as the lead ends of the two dispersion maps 30 and 32 are properly located on the graph 50, their point of intersection will precisely determine the respective lengths of RSTW and DCF fiber required to produce a combined transmission line of the desired total length and path-average dispersion at a mean wavelength.

In addition to being a function of fiber length, dispersion is also wavelength-dependent. Thus, although the above-described technique produces a transmission line with the desired path-average dispersion $\overline{D}$ at a mean wavelength, the transmission line may not display the desired $\overline{D}$ throughout the entire range of signal wavelengths to be transmitted. The reason for this is illustrated in FIGS. 8 through 12, and discussed below.

Figure 8:
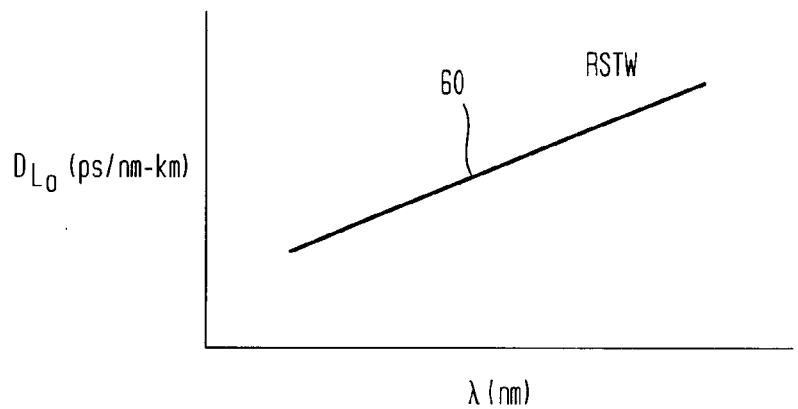
FIG. 8 shows a linearized map of dispersion as a function of wavelength for a given length RSTW fiber.

FIG. 8 shows a map 60, not drawn to scale, illustrating the relationship between dispersion $\overline{D}$ and wavelength λ for a given length $L_o$ of RSTW fiber. As shown in FIG. 8, the longer the wavelength λ, the greater the amount of dispersion D. Similar to the technique used to calculate the path-average dispersion $\overline{D}$ for a given span of optical fiber, the overall $$\frac{\partial D}{\partial \lambda}$$

for the span of fiber can be determined by integrating $$\frac{\partial D}{\partial \lambda}$$

with respect to fiber length and then dividing the integrated $$\frac{\partial D}{\partial \lambda},$$

expressed as $$\left(\frac{\partial D}{\partial \lambda}\right)int,$$

by the length of the span. FIG. 9 shows a linearized map of $$\left(\frac{\partial D}{\partial \lambda}\right)int$$

for RSTW fiber, based upon an average $$\frac{\partial D}{\partial \lambda}$$

value for RSTW fiber of +0.046 ps/nm$^2$-km.

FIG. 10 shows a map 64 illustrating the relationship between dispersion and wavelength for a given length $L_o$ of DCF fiber. As shown in FIG. 10, the amount of negative dispersion increases as the wavelength increases. FIG. 11 shows a linearized map 66 illustrating $$\left(\frac{\partial D}{\partial \lambda}\right)int$$

for the DCF fiber, based upon an average $$\frac{\partial D}{\partial \lambda}$$

value for DCF fiber of −0.78 ps/nm$^2$-km.

Returning to FIG. 7, it will be recalled that, based upon the dispersion parameters of RSTW and DCF fiber, the ratio between the lengths of the two fibers in a combined transmission line required to obtain a zero path-average dispersion is expected to be approximately 28.75 to 1. However, the expected ratio of the two fibers required to obtain a zero average value for $$\frac{\partial D}{\partial \lambda}$$

is 0.78/0.046 or approximately 16.96 to 1. Thus, it follows that the combined fiber transmission line 40 shown in FIG. 7 will have a non-zero total $$\frac{\partial D}{\partial \lambda}.$$

FIG. 12 illustrates the problem. The diagram of the transmission line 40 at the top of FIG. 12 and the graph 50 at the middle of FIG. 10 are taken from FIG. 7. A second graph 70 has been drawn underneath the middle graph 50. In this second graph 70, the x-axis corresponds to fiber length, and the y-axis corresponds to $$\left(\frac{\partial D}{\partial \lambda}\right)int.$$

The RSTW $$\left(\frac{\partial D}{\partial \lambda}\right)int$$

map 62 shown in FIG. 9 is translated onto graph 70, such that the lead end of the map 62 is located at the origin 72. The DCF $$\left(\frac{\partial D}{\partial \lambda}\right)int$$

map 66 shown in FIG. 11 is rotated and translated onto graph 70, such that: (1) the map 66 originates at a point 74 having the same x-coordinate as point 54 on graph 50, reflecting the total length of the transmission line 40; and (2) the map 66 intersects the RSTW $$\left(\frac{\partial D}{\partial \lambda}\right)int$$

map 62 at a point 76 having the same x-coordinate as point 56 on graph 50, reflecting the point in the transmission line at which one fiber ends and the other begins. After this translation operation has been performed, it will be seen that the y-coordinate of point 74 graphically represents $$\frac{\partial D}{\partial \lambda}L$$

for the combined lengths of RSTW fiber 42 and the DCF fiber 44.

Thus, from FIG. 12, it is apparent why the $$\frac{\partial D}{\partial \lambda}$$

for the combined transmission line has a non-zero value. In essence, the negative contribution to total $$\frac{\partial D}{\partial \lambda}$$

made by the DCF fiber 44 is insufficient to fully compensate for the positive contribution to total $$\frac{\partial D}{\partial \lambda}$$

made by the RSTW fiber 42 to obtain a total $$\frac{\partial D}{\partial \lambda}$$

with a zero value.

According to the present invention, substantially exact simultaneous attainment of the desired path-average dispersion $\overline{D}$, either zero or very small, and zero $$\frac{\partial D}{\partial \lambda}$$

at any desired mean wavelength is accomplished by the addition of a length of standard positive-dispersion optical fiber to the lengths of RSTW and DCF fiber. This simultaneous control is possible because the addition of standard fiber forces the increase of the amount of DCF, and hence of its negative contribution to $$\frac{\partial D}{\partial \lambda},$$

much faster than it increases the average $$\frac{\partial D}{\partial \lambda}$$

of the combined standard and RSTW fibers.

The precise lengths of the standard, RSTW and DCF fibers to be spliced together are calculated based upon a graphical analysis of the dispersion and $$\left(\frac{\partial D}{\partial \lambda}\right)int$$

maps for the three fiber types. The dispersion of standard fiber (STD), integrated with respect to fiber length, is illustrated in map 80 of FIG. 13. This map 80 is not drawn to scale. For reference, the corresponding map 30 for RSTW fiber is shown as a broken line. FIG. 14 shows a map 82, not drawn to scale, illustrating $$\left(\frac{\partial D}{\partial \lambda}\right)int$$

for the standard fiber. Again, the corresponding map 62 for RSTW fiber is shown as a broken line for reference. The dispersion parameter for standard fiber is +16.7 ps/nm-km, which is more than four times greater than the dispersion parameter for RSTW fiber. On the other hand, the average slope $$\frac{\partial D}{\partial \lambda}$$

of standard fiber is +0.056 ps/nm²-km, which is only slightly greater than the slop $$\frac{\partial D}{\partial \lambda}$$

of RSTW fiber, which as mentioned above is +0.046 ps/nm²-km.

In adding a length of standard fiber to an RSTW-DCF transmission line, it is possible to preserve both the total length of the transmission line, as well as the total dispersion, by maintaining a precisely calculated ratio among the three fiber types. FIG. 15 illustrates a graphical technique that can be used to calculate this ratio. At the top of FIG. 15, a diagram is shown of a transmission line 90, comprising lengths of RSTW fiber 92, standard fiber 94, and DCF fiber 96. Underneath the transmission line 90 is a graph 100 of their corresponding integrated dispersion maps 30, 32, and 80, rotated and translated as described below.

The RSTW integrated dispersion map 30 is once again placed onto the graph 100, with its lead end located at the origin 102, and the DCF integrated dispersion map 32 is rotated and translated onto the graph 100 with its lead end located at a point A corresponding to the length of the transmission line 90 and the desired value for the integrated dispersion D for the combined transmission line (path-average dispersion $\overline{D}$ multiplied by the length of the transmission line 90). The RSTW and DCF integrated maps 30 and 32 intersect at a point 104, the x-coordinate 106 of which would be used to calculate the respective lengths of the fibers in a two-fiber line. The standard fiber map 80 is translated onto the graph 100 such that the lead end of the standard fiber map 80 lies at a point B on the RSTW map 30, and such that the standard fiber map 80 intersects the DCF map 32 at a point C. The point B at which the lead end of the standard fiber map 80 is located on the RSTW map 30 may be any point on the RSTW map 30 between the origin 102 and point 104. A location of point B at the origin 102 corresponds to a transmission line comprising only standard and DCF fiber. A location of point B at or beyond point 104 corresponds to a transmission line comprising only RSTW and DCF fiber.

The lengths of the three fibers are determined by the origin 102, the x-coordinate 108 of point B, the x-coordinate 110 of point C, and the x-coordinate of point A. In the present example, point A lies on the x-axis, so there is no separate point representing its x-coordinate. The length of the RSTW fiber 92 is the distance between the origin and x-coordinate 108, the length of the standard fiber 94 is the distance between x-coordinate 108 and x-coordinate 110, and the length of the DCF fiber 96 is the distance between x-coordinate 116 and the x-coordinate of point A.

It will be seen from FIG. 15 that so long as the RSTW and DCF maps 30 and 32 remain stationary, the location of point B may be moved to any point along the RSTW dispersion map 30 without changing the total length and path-average dispersion of the transmission line 90. Further, it will be seen that the movement of point B along the RSTW dispersion map 30 will cause a movement of point C along the DCF dispersion map 32. The combined movement of points B and C, in turn, will produce an adjustment in the relative lengths of the three fibers. Without the standard fiber 94, the length of the DCF fiber would be calculated to be the distance between the x-coordinate of intersection point 106 and the x-coordinate of point A. With the addition of the standard fiber 94, the length of the DCF fiber has been increased by the distance $\Delta L_{DCF}$.

The integrated dispersion and $$\frac{\partial D}{\partial \lambda}$$

maps of the RSTW, DCF, and standard fibers are shaped such that although the movement of points B and C in the graph 100 does not affect the total length or dispersion of the transmission line, it causes a continuous adjustment to the total $$\frac{\partial D}{\partial \lambda}.$$

Thus, a zero value (or any other desired value) for $$\frac{\partial D}{\partial \lambda}$$

may he obtained by selecting a suitable location for point B. This is illustrated by FIG. 16, which shows the transmission line 90 and graph 100 of FIG. 15 and a graph 120 illustrating $$\frac{\partial D}{\partial \lambda} L$$

for the transmission line 90. The RSTW $$\left(\frac{\partial D}{\partial \lambda}\right)_{int}$$

map 62 is placed on the graph 120 such that its lead end is located at the origin 122. The standard fiber $$\left(\frac{\partial D}{\partial \lambda}\right)_{int}$$

map 82 is translated onto the graph 120 such that its lead end is located on the RSTW $$\left(\frac{\partial D}{\partial \lambda}\right)_{int}$$

map 62 at a point 124 with the same x-coordinate as point B in graph 100. Finally, the DCF $$\left(\frac{\partial D}{\partial \lambda}\right)_{int}$$

map 66 is rotated and translated onto the graph 120 such that its lead end is located at a point 128 that has the same x-coordinate as point A, and such that the map 66 intersects the standard fiber $$\left(\frac{\partial D}{\partial \lambda}\right)_{int}$$

map at a point 126 having the same x-coordinate as point C. It will be seen that the y-coordinate of point 128 is equal to $$\left(\frac{\partial D}{\partial \lambda}\right)_{int} L$$

for the combined transmission line 90.

Comparing graph 120 in FIG. 16 with graph 70 in FIG. 12, it will be seen that the addition of standard fiber 94 to the transmission line 90 causes $$\frac{\partial D}{\partial \lambda} L$$

to be adjusted downward to zero. For ease of reference, the DCF $$\left(\frac{\partial D}{\partial \lambda}\right)_{int}$$

map from FIG. 12 is shown as broken line 66' in FIG. 16. It will be appreciated that the reason for this downward adjustment of $$\frac{\partial D}{\partial \lambda} L$$

is that, as shown in FIG. 16, the increase in the amount of DCF fiber produces an increased negative contribution to the combined $$\frac{\partial D}{\partial \lambda}$$

that exceeds the increased positive contribution made to the combined $$\frac{\partial D}{\partial \lambda}$$

by the addition of standard fiber.

The above-described technique can be summarized as a series of equations that must be solved simultaneously. In order to create a combined transmission line with a desired length $L_{TOTAL}$, a desired path-average dispersion $\overline{D}$, and a desired dispersion slope $$\left(\frac{\partial D}{\partial \lambda}\right)_{TOTAL},$$

the following three conditions must be satisfied:

$$L1+L2+L3=L_{TOTAL} \tag{1}$$

where L1, L2, and L3 represent the respective lengths of the spans of RSTW, STD and DCF fibers;

$$\int_0^{L1} D_{RSTW}(x)dx + \int_0^{L2} D_{STD}(x)dx + \int_0^{L3} D_{DCF}(x)dx = \overline{D}L_{TOTAL} \tag{2}$$

where $D_{RSTW}(X)$, $D_{STD}(X)$, and $D_{DCF}(X)$ are the respective dispersion functions of the three fibers at a reference wavelength; and $$\left(\frac{\partial D}{\partial \lambda}\right)_{int(RSTW)} + \left(\frac{\partial D}{\partial \lambda}\right)_{int(STD)} + \left(\frac{\partial D}{\partial \lambda}\right)_{int(DCF)} = \left(\frac{\partial D}{\partial \lambda}\right)_{TOTAL} L_{TOTAL} \tag{3}$$

where $$\left(\frac{\partial D}{\partial \lambda}\right)_{int(RSTW)}, \left(\frac{\partial D}{\partial \lambda}\right)_{int(STD)}, \text{ and } \left(\frac{\partial D}{\partial \lambda}\right)_{int(DCF)}$$

are the respective values for $$\frac{\partial D}{\partial \lambda},$$

integrated with respect to fiber length, for each of the three fiber spans.

FIG. 17 shows a diagram of a transmission line 130 embodying the present invention and a graph 150 showing relative signal power versus distance. As shown in FIG. 17, guiding filters 132 and 134 lead into and out of the transmission line 130. Between the guiding filters 132 and 134 are a length of standard fiber 136, a length of DCF fiber 138, a length of RSTW fiber 140, and a second length of standard fiber 142. A Raman pump (~1450 nm) 144 is provided at the far end of the transmission line 130 for amplification of the transmitted signal. FIG. 18 shows a graph 160 of the mean behavior of the path-average dispersion $\overline{D}$ as a function of wavelength. This function $\overline{D}$ ($\lambda$) was quickly and accurately determined from differential time-of-flight measurements on pulse trains separated in wavelength by approximately 2 nm. The resulting curve 162 in FIG. 18 is a shallow parabola with a peak $$\left(\frac{\partial D}{\partial \lambda} = 0\right)$$

1547 nm.

The transmission line 130 shown in FIG. 17 is suitable for ultra-long distance, massive WDM, which places many simultaneous and stringent demands on the design of the dispersion map and its pulse behavior. First, the map must possess a path-average dispersion $\overline{D}$ that is nearly constant over the required wavelength range. However, it must also provide for adequate soliton pulse energy at low $\overline{D}$ (i.e., $\overline{D}$<0.3 ps/nm-km), exhibit negligible adjacent pulse interaction within each channel, and be compatible with the use of guiding filters. Finally, with respect to interaction between channel, four-wave mixing must be negligible, and the effects of the inevitable cross-phase modulation (XPM) must be reduced to a minimum.

It will be appreciated that the present invention is not limited to only three lengths of fiber. As many separate sections of fiber as needed may be combined, with the overall path-average dispersion $\overline{D}$ managed as described above. Different combinations of fibers can be used, positive, negative, etc. As new fibers are developed, with new dispersion properties, the present invention may be practiced with different configurations of fibers. Also, although the technique has been described to the transmission needs for dense WDM, it will be apparent that the disclosed techniques can be adapted for use in other applications without departing from the spirit of the invention.

A further application of the present invention is to provide precise, fine adjustment to a transmission line made up of fibers already having matched dispersion and $$\frac{\partial D}{\partial \lambda}$$

characteristics. Because of the above-discussed inhomogeneities in optical fiber, even closely matched fibers may require adjustment.

In addition, the present invention may be used to refurbish already existing optical fiber transmission lines currently used for applications in which the path-average dispersion $\overline{D}$ and $$\frac{\partial D}{\partial \lambda}$$

are not critical. These lines may be adapted for use in applications having critical path-average dispersion $\overline{D}$ and $$\frac{\partial D}{\partial \lambda}$$

requirements by adding suitable lengths of compensating fiber and/or standard fiber, the lengths being calculated using the above-described techniques.

Further, as mentioned above, the present invention may also be practiced using a combined transmission line that includes a positive-dispersion fiber and two negative-dispersion DCF fibers. This approach may be advantageously used in upgrading an existing transmission line comprising a length of positive-dispersion fiber. Using the techniques described above, two relatively short lengths of DCF fiber that are selected to have suitable $\overline{D}$ and $$\frac{\partial D}{\partial \lambda}$$

characteristics could be combined with the positive-dispersion fiber to create a combined transmission line with a desired overall $\overline{D}$ and $$\frac{\partial D}{\partial \lambda}.$$

While the foregoing description includes details which will enable those skilled in the art to practice the invention, it should be recognized that the description is illustrative in nature and that many modifications and variations thereof will be apparent to those skilled in the art having the benefit of these teachings. It is accordingly intended that the invention herein be defined solely by the claims appended hereto and that the claims be interpreted as broadly as permitted by the prior art.

We claim:

1. A method for constructing an optical fiber transmission line, comprising the following steps:

(a) selecting a first fiber having a first dispersion and $$\frac{\partial D}{\partial \lambda};$$

(b) selecting a second fiber having a second dispersion and $$\frac{\partial D}{\partial \lambda}$$

with a sign opposite to that of the dispersion and $$\frac{\partial D}{\partial \lambda}$$

of the first fiber;

(c) selecting a third fiber having a third dispersion and $$\frac{\partial D}{\partial \lambda},$$

the first, second and third fibers having different dispersion slopes, such that when a transmission line having a desired total length L and path-average dispersion $\overline{D}$ is assembled from the first, second and third fibers, the total $$\frac{\partial D}{\partial \lambda}$$

of the transmission line is adjustable by adjusting the respective lengths of the first, second, and third fibers, while maintaining the total length and path-average dispersion $\overline{D}$ of the transmission line; and (d) using the respective integrated dispersion maps of each of the first, second, and third fibers to calculate the respective lengths of the three fibers needed to assemble a transmission line having the desired length, path-average dispersion $\overline{D}$, and $$\frac{\partial D}{\partial \lambda}.$$

2. The method of claim 1, wherein the first and third fiber are positive-dispersion fibers, and wherein the second fiber is a negative-dispersion fiber.

3. The method of claim 2, wherein the first fiber has a first dispersion slope, the second fiber has a second dispersion slope, and the third fiber has a third dispersion slope, and wherein the third dispersion slope is steeper than the first dispersion slope, and the second dispersion slope is steeper than the third dispersion slope.

4. The method of claim 1, wherein the first fiber is a positive-dispersion fiber, and whether the second and third fibers are negative-dispersion fibers.

5. The method of claim 4, wherein the second and third fibers are dispersion-compensating fibers.

6. A method for constructing an optical fiber transmission line, comprising the following steps:

(a) selecting a first fiber having a first dispersion and $$\frac{\partial D}{\partial \lambda};$$

(b) selecting a second fiber having a second dispersion and $$\frac{\partial D}{\partial \lambda}$$

with a sign opposite to that of the dispersion and $$\frac{\partial D}{\partial \lambda}$$

of the first fiber;

(c) selecting a third fiber having a third dispersion and $$\frac{\partial D}{\partial \lambda}$$

such that when a transmission line having a desired total length L and path-average dispersion $\overline{D}$ is assembled from the first, second and third fibers, the total $$\frac{\partial D}{\partial \lambda}$$

of the transmission line is adjustable by adjusting the respective lengths of the first, second, and third fibers, while maintaining the total length and path-average dispersion $\overline{D}$ of the transmission line; and (d) using the dispersion maps of the first, second, and third fibers to calculate the respective lengths of the three fibers needed to assemble a transmission line having the desired length, path-average dispersion $\overline{D}$, and $$\frac{\partial D}{\partial \lambda}$$

by:

(d1) mapping the integrated dispersion function of the first fiber onto a graph with an x-axis corresponding to the length of the fiber, the y-axis corresponding to the integrated dispersion, and the origin of the graph corresponding to the lead end of the first fiber;

(d2) mapping the integrated dispersion functions of the second fiber and rotating and linearly translating the second fiber integrated dispersion map onto the graph, such that the lead end of the translated second fiber integrated dispersion map is translated onto a point A on the graph corresponding to the desired length of the assembled transmission line and total integrated dispersion of the transmission line required to obtain the desired path-average dispersion $\overline{D}$, and such that the second fiber integrated dispersion map intersects the first fiber integrated dispersion map; and (d3) mapping the integrated dispersion function of the third fiber and rotating and linearly translating the third fiber integrated dispersion map onto the graph, such that the lead end of the translated third fiber dispersion map is translated onto a point B on the first fiber integrated dispersion map, and such that the translated third fiber integrated dispersion map intersects the translated integrated second dispersion map at a point C, whereby the origin and the x-coordinates of points A, B, and C determine the respective lengths of the first, second, and third fibers, the position of point B along the first fiber integrated dispersion map being chosen to obtain a desired value for the combined total $$\frac{\partial D}{\partial \lambda}$$

for the transmission line.

7. The method of claim 6, wherein in step (d3) the combined total $$\frac{\partial D}{\partial \lambda}$$

for the transmission line is zero.

8. The method of claim 6, wherein in step (d3) the length of the first fiber is the distance between the origin and the x-coordinate of point B, the length of the second fiber is the distance between the x-coordinates of points B and C, and the length of the third fiber is the distance between the x-coordinates of points C and A.

9. The method of claim 6, wherein in step (d2), the required total integrated dispersion is determined by multiplying the desired path-average dispersion $\overline{D}$ by the length of the transmission line.

10. The method of claim 6, wherein in steps (d1), (d2), and (d3), the integrated dispersion maps of the first, second, and third fibers are obtained using a dispersion optical time-domain reflectometer.

11. The method of claim 6, wherein in step (d3) the desired combined total value for $$\frac{\partial D}{\partial \lambda}$$

is obtained by integrating $$\frac{\partial D}{\partial \lambda}$$

with respect to fiber length to determine $$\left(\frac{\partial D}{\partial \lambda}\right)_{int}$$

for each of the first, second, and third fibers and then and choosing a point B that results in lengths for the first, second, and third fibers having respective mapped values for $$\left(\frac{\partial D}{\partial \lambda}\right)_{int}$$

adding up to a combined total value for $$\left(\frac{\partial D}{\partial \lambda}\right)_{int}$$

required to obtain the desired combined total value for $$\frac{\partial D}{\partial \lambda}.$$

12. The method of claim 11, wherein the desired combined total value for $$\frac{\partial D}{\partial \lambda}$$

is zero.

13. An optical fiber transmission line, comprising:

a first fiber having a first dispersion and $$\frac{\partial D}{\partial \lambda};$$

a second fiber having a second dispersion and $$\frac{\partial D}{\partial \lambda}$$

with a sign opposite to that of the dispersion and $$\frac{\partial D}{\partial \lambda}$$

of the first fiber;

a third fiber having a third dispersion and $$\frac{\partial D}{\partial \lambda};$$

the first, second and third fibers having different dispersion slopes, such that when a transmission line having a desired total length L and path-average dispersion $\overline{D}$ is assembled from the first, second, and third fibers, the $$\frac{\partial D}{\partial \lambda}$$

of the transmission line is adjustable by adjusting the respective lengths of the first, second, and third fibers, while maintaining the total length and path-average dispersion $\overline{D}$ of the transmission line, the first, second, and third fibers assembled together into a transmission line, the respective lengths of the first, second, and third fibers being calculated using the respective integrated dispersion maps of each of the three fibers such that the assembled transmission line has the length, path-average dispersion $\overline{D}$, and $$\frac{\partial D}{\partial \lambda}.$$

14. The transmission line of claim 13, wherein the first and third fiber are positive-dispersion fibers, and wherein the second fiber is a negative-dispersion fiber.

15. The transmission line of claim 14, wherein the first fiber has a first dispersion slope, the second fiber has a second dispersion slope, and the third fiber has a third dispersion slope, and wherein the third dispersion slope is steeper than the first dispersion slope, and the second dispersion slope is steeper than the third dispersion slope.

16. The transmission line of claim 13, wherein the first fiber is a positive-dispersion fiber, and wherein the second and third fibers are negative-dispersion fibers.

17. The transmission line of claim 16, wherein the second and third fibers are dispersion-compensating fibers.

18. An optical fiber transmission line, comprising:

a first fiber having a first dispersion and $$\frac{\partial D}{\partial \lambda};$$

a second fiber having a second dispersion and $$\frac{\partial D}{\partial \lambda}$$

with a sign opposite to that of the dispersion and $$\frac{\partial D}{\partial \lambda}$$

of the first fiber;
a third fiber having a third dispersion and $$\frac{\partial D}{\partial \lambda}$$

such that when a transmission line having a desired total length L and path-average dispersion $\overline{D}$ is assembled from the first, second, and third fibers, the $$\frac{\partial D}{\partial \lambda}$$

of the transmission line is adjustable by adjusting the respective lengths of the first, second, and third fibers, while maintaining the total length and path-average dispersion $\overline{D}$ of the transmission line,
the first, second, and third fibers assembled together into a transmission line, the respective lengths of the first, second, and third fibers being calculated using the dispersion maps of the three fibers such that the assembled transmission line has the length, path-average dispersion $\overline{D}$, and $$\frac{\partial D}{\partial \lambda},$$

wherein the respective lengths of the first, second, and third fibers are calculated by:
(a) mapping the integrated dispersion function of the first fiber onto a graph with an x-axis corresponding to the length of the fiber, the y-axis corresponding to the integrated dispersion, and the origin of the graph corresponding to the lead end of the first fiber;
(b) mapping the integrated dispersion function of the second fiber and rotating and linearly translating the second fiber integrated dispersion map onto the graph, such that the lead end of the translated second fiber integrated dispersion map is translated onto a point A on the graph corresponding to the desired length of the assembled transmission line and total integrated dispersion of the transmission line required to obtain the desired path-average dispersion $\overline{D}$, and such that the second fiber integrated dispersion map intersects the first fiber integrated dispersion map; and
(c) mapping the integrated dispersion function of the third fiber and rotating and linearly translating the third fiber integrated dispersion map onto the graph, such that the lead end of the translated third fiber dispersion map is translated onto a point B on the first fiber integrated dispersion map, and such that the translated third fiber integrated dispersion map intersects the translated integrated second dispersion map at a point C, whereby the origin and the x-coordinates of points A, B, and C determine the respective lengths of the first, second, and third fibers, the position of point B along the first fiber integrated dispersion map being chosen to obtain a desired value for the combined total $$\frac{\partial D}{\partial \lambda}$$

for the transmission line.

19. The transmission line of claim 18, wherein the combined total $$\frac{\partial D}{\partial \lambda}$$

for the transmission line is zero.

20. The transmission line of claim 18, wherein the length of the first fiber is the distance between the origin and the x-coordinate of point B, the length of the second fiber is the distance between the x-coordinates of points B and C, and the length of the third fiber is the distance between the x-coordinates of points C and A.

21. The transmission line of claim 18, wherein the required total integrated dispersion is determined by multiplying the desired path-average dispersion $\overline{D}$ by the length of the transmission line.

22. The transmission line of claim 18, wherein the integrated dispersion maps of the first, second, and third fibers are obtained using a dispersion optical time-domain reflectometer.

23. The transmission line of claim 18, wherein the desired combined total value for $$\frac{\partial D}{\partial \lambda}$$

is obtained by integrating $$\frac{\partial D}{\partial \lambda}$$

with respect to fiber length to determine $$\left(\frac{\partial D}{\partial \lambda}\right)_{int}$$

for each of the first, second, and third fibers and then and choosing a point B that results in lengths for the first, second, and third fibers having respective mapped values for $$\left(\frac{\partial D}{\partial \lambda}\right)_{int}$$

adding up to a combined total value for $$\left(\frac{\partial D}{\partial \lambda}\right)_{int}$$

required to obtain the desired combined total value for $$\frac{\partial D}{\partial \lambda}.$$

24. The transmission line of claim 23, wherein the desired combined total value for $$\frac{\partial D}{\partial \lambda}$$

is is zero.

25. A method for refurbishing an existing transmission line comprising a first length of fiber having a first dispersion and $$\frac{\partial D}{\partial \lambda},$$

comprising:

(a) selecting second fiber having a second dispersion and $$\frac{\partial D}{\partial \lambda};$$

(b) selecting a third fiber having a third dispersion and $$\frac{\partial D}{\partial \lambda},$$

at least one of the second and third fibers having a dispersion and $$\frac{\partial D}{\partial \lambda}$$

with a sign opposite to that of the dispersion and $$\frac{\partial D}{\partial \lambda}$$

of the first fiber, the first, second and third fibers having different dispersion slopes, such that when a transmission line having a desired total length and path-average dispersion $\overline{D}$ is assembled from the first, second and third fibers, the total $$\frac{\partial D}{\partial \lambda}$$

of the transmission line is adjustable by adjusting the respective lengths of the first, second, and third fibers, while maintaining the total length and path-average dispersion $\overline{D}$ of the transmission line; and (c) using the respective integrated dispersion maps of each of the first, second, and third fibers to calculate the respective lengths of the three fibers needed to assemble a transmission line having the desired length, path-average dispersion $\overline{D}$, and $$\frac{\partial D}{\partial \lambda}.$$

* * * * *